United States Patent [19]

Schenk

[11] 4,305,996

[45] Dec. 15, 1981

[54] HYDROXYL-CONTAINING LIQUID POLYMERS AND ADHESIVES MADE THEREFROM

[75] Inventor: William N. Schenk, Peninsula, Ohio

[73] Assignee: The B. F. Goodrich Company, Akron, Ohio

[21] Appl. No.: 129,010

[22] Filed: Mar. 10, 1980

[51] Int. Cl.$^3$ .................... B32B 27/40; C08G 18/10; C07C 69/34; C07C 55/00

[52] U.S. Cl. ......................... 428/423.1; 428/425.1; 428/425.8; 428/522; 428/419; 525/404; 525/440; 528/75; 560/190; 562/590

[58] Field of Search ................ 560/190; 562/590; 525/404, 440; 428/423.1, 425.1, 425.8, 419, 522; 528/75

[56] References Cited

U.S. PATENT DOCUMENTS

| | | | |
|---|---|---|---|
| 4,128,600 | 12/1978 | Skinner et al. | 528/75 |
| 4,145,511 | 3/1979 | Gilles | 528/75 |
| 4,145,514 | 3/1979 | de Vry et al. | 428/425.1 |
| 4,225,695 | 9/1980 | Schuster et al. | 528/75 |

Primary Examiner—William J. Van Balen
Attorney, Agent, or Firm—J. Hughes Powell, Jr.; George A. Kap

[57] ABSTRACT

This invention relates to a low viscosity hydroxylated liquid polymer having polymerized therein a mercaptan compound containing hydroxyl and/or carboxyl group(s) in an amount sufficient to reduce viscosity and provide low peel property on the order of 10 to 25 ounces without significantly lowering the adhesive properties thereof, to a removable, low peel adhesive which is a reaction product of the liquid polymer and an isocyanate prepolymer, and to a substrate having deposited thereon said adhesive. The removable adhesive produces a clean 180° peel while maintaining good tack and shear and due to its low viscosity, it can be processed at 100% solids, i.e., without any solvent.

28 Claims, No Drawings

HYDROXYL-CONTAINING LIQUID POLYMERS AND ADHESIVES MADE THEREFROM

BACKGROUND OF THE INVENTION

The low-peel pressure sensitive adhesives available in commerce today have a high reject rate. They are highly compounded rubber compositions which contain large amounts of solvent, ranging up to about 60%, which must be removed before final curing of the adhesive takes place. Hot melt adhesives are also available, however, they have the disadvantage of a narrow utility range, i.e., the physical parameters must be adjusted and closely monitored for the hot melts to be in a useable condition.

To overcome these and other disadvantages of the above-mentioned adhesives, polyurethane-based adhesives have been proposed which are prepared by reacting a hydroxyl-containing liquid polymer with a prepolymer of an isocyanate-terminated polyester or polyether. Since the current coating apparatus can apply adhesives having viscosity of up to about 20,000 cps, efforts have been made to reduce viscosity of the polyurethane-based adhesives.

SUMMARY OF THE INVENTION

This invention relates to low-peel and low viscosity polyurethane-based adhesives. Such adhesives are prepared by mixing a low viscosity hydroxyl-containing liquid polymer with an isocyanate-terminated prepolymer. Low viscosity of the hydroxyl-containing liquid polymer is obtained by polymerizing a mercaptan compound containing hydroxyl and/or carboxyl group(s) together with at least one alkyl acrylate and a chain transfer agent to form the low viscosity hydroxyl-containing liquid polymer directly or by initially preparing a carboxyl-containing liquid polymer of low viscosity and then converting it to hydroxyl-containing liquid polymer.

DETAILED DESCRIPTION OF THE INVENTION

Reducing viscosity of the hydroxylated liquid polymer enables processing of the adhesive containing the polymer at 100% solids or nearly 100% solids. With the advent of air pollution consciousness, this feature is of utmost importance since at 100% solids there is no solvent to contend with. The trend is definitely away from using solvents and this invention offers an attractive alternative to solvent-based adhesives.

The hydroxyl-terminated liquid polymers of low viscosity can be prepared in several ways. This can be accomplished by initially preparing a carboxyl-terminated liquid polymer with a mercaptan compound using an appropriate initiator and then converting the carboxyl groups to hydroxyl groups with either alkylene oxide in presence of a tertiary amine catalyst or with a diol in presence of an acid catalyst. The hydroxyl-terminated liquid polymers of low viscosity can also be prepared by a direct route by polymerizing at least one alkyl acrylate in the presence of hydroxyl-containing disulfide and a mercaptan compound in presence of an initiator or ultraviolet radiation to initiate polymerization.

In reference to adhesive applications, the de Vry U.S. Pat. No. 4,145,514 verifies that only hydroxyl-containing liquid polymers with both terminal and random hydroxyl functionality are useful. Random hydroxyl functionality is defined as the presence of hydroxyl groups which are pendant from a portion of the polymeric backbone other than the ends thereof. Hydroxy-containing liquid polymers with only terminal or random hydroxyl functionality are deficient in one or more of the adhesive properties, such as rolling ball tack, 180° peel adhesion, and shear adhesion.

Preparation of hydroxyl-terminated liquid polymers is well known in the art. Random hydroxyl groups can be introduced along the backbone of the liquid polymer in a number of ways to obtain terminal and random hydroxyl functionality. When the hydroxyl-terminated liquid polymers are prepared indirectly via the carboxyl-terminated liquid polymer route, random hydroxyl functionality is provided in a known manner by adding a carboxylated comonomer, such as acrylic acid, during the polymerization reaction. This introduces random carboxyl groups along the backbone of the liquid polymer which groups, together with the terminal carboxyl groups, are subsequently converted to hydroxyl groups. When the hydroxyl-terminated liquid polymers are produced by the direct route, random hydroxyl functionality can be introduced in a known manner by polymerizing a hydroxyl-containing monomer, such as a hydroxyalkyl ester of alpha, beta-ethylenically unsaturated aliphatic and aromatic carboxylic acid of 3 to 12 carbon atoms, preferably 3 to 8, i.e., acrylate or methacrylate, wherein the alkyl group contains 1 to 12, preferably 1 to 6 carbon atoms. Specific examples of such hydroxyl-containing monomers include 2-hydroxyethyl acrylate and methacrylate, 2,3-dihydroxypropyl acrylate and methacrylate, 6,10-dihydroxydecyl acrylate and methacrylate, similar glycol monoesters of unsaturated carboxylic acids, and vinyl benzyl alcohol. Also included are esters of unsaturated dicarboxylic acids, such as maleic acid; unsaturated aliphatic alcohols such as allyl alcohol, methylallyl alcohol, allyl carbinol, beta-allyl ethyl alcohol, and vinyl ethyl carbinol; 2-hydroxyethyl vinyl ether, 2-hydroxyethyl vinyl sulfide, and other similar compounds wherein both a hydroxyl group and a polymerizable ethylenic group are present. In a preferred embodiment, the hydroxyl-containing monomers have hydroxyl group located on the terminal carbon atom.

The alkyl acrylate liquid polymers containing both terminal and random hydroxyl functionality have molecular weight ($\overline{M}_n$) from about 1,000 to 6,000, as determined by cryoscopic, ebullioscopic or osmometric methods; more preferably, the molecular weights may be from about 2,000 to 4,000. The hydroxylated liquid alkyl acrylate polymers have Brookfield viscosity at 25° C. from about 50,000 cps to 500,000 cps, more preferably from about 100,000 cps to 200,000 cps. They contain an average of about 1.4 to 6 hydroxyl groups per molecule, preferably from about 1.7 to 3.5.

The hydroxylated liquid acrylate polymers contain polymerized therein at least about 65 weight percent, more preferably at least about 85 weight percent, of at least one alkyl acrylate wherein the alkyl group contains from 3 to 10 carbon atoms, more preferably from 3 to 8 carbon atoms. The alkyl acrylate forms the backbone of the hydroxylated liquid polymer. Examples of suitable alkyl acrylates as the primary components of the polymer backbone include n-butyl acrylate, n-hexyl acrylate, 2-ethylhexyl acrylate, and the like, and mixtures thereof. Excellent results were obtained using n-butyl acrylate.

The hydroxyl functionality in the hydroxyl-containing liquid polymers can be provided by carboxylated monomers and/or hydroxyl-containing monomers, as described above. Total amount of such monomers to provide hydroxyl functionality in either the direct or indirect process for preparing hydroxyl-containing liquid polymers varies from about 0.1 to 30, preferably 1 to 20 weight percent, based on the weight of all of the monomers. For improved clarity and adhesion, the hydroxyl-containing liquid polymers are also prepared by interpolymerizing from 1 to 20, preferably about 2 to 10 weight percent, based on the weight of combined weight of the monomers, of N-vinyl-2-pyrrolidone. The balance of the polymer, typically from 0 to 30, preferably 1 to 10 weight percent, is at least one other olefinically unsaturated monomer that is polymerized therein, more preferably at least one other vinylidene monomer, i.e., a monomer containing at least one terminal CH$_2$=C< group per molecule, in the polymeric backbone.

Preferred vinylidene comonomers in the polymeric backbone include dienes containing 4 to 10 carbon atoms, more preferably 4 to 8 carbon atoms, such as butadiene, isoprene, 2-isopropyl-1,3-butadiene, and chloroprene; vinyl nitriles such as acrylonitrile, and methacrylonitrile; alkyl acrylates and methacrylates wherein the alkyl group contains 1 to 18 carbon atoms having the formula

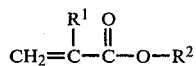

wherein R$^1$ is hydrogen or an alkyl radical containing 1 to 3 carbon atoms, and R$^2$ is hydrogen or an alkyl radical containing 1, 2 or 11 to 18 carbon atoms, or an alkoxyalkyl, alkylthioalkyl, or cyanoalkyl radical containing 2 to 12 carbon atoms, more preferably 2 to 8 carbon atoms. Alternatively R$^1$ may be an alkyl radical containing 1 to 3 carbon atoms and R$^2$ an alkyl radical containing 3 to 10 carbon atoms. Suitable acrylates include ethyl acrylate, dodecyl acrylate, octadecyl acrylate, methoxyethyl acrylate, butoxyethyl acrylate, hexylthioethyl acrylate, β-cyanoethyl acrylate, cyanooctyl acrylate, methyl methacrylate, and the like. Comonomeric mixtures may also be used. Excellent results were obtained using butadiene, ethyl acrylate and/or acrylonitrile comonomers with n-butyl acrylate as the principal monomer.

Other suitable vinylidene comonomers include vinyl aromatics such as styrene, methyl styrene, chlorostyrene, and vinyl toluene; vinyl and allyl esters of carboxylic acids containing 2 to 8 carbon atoms such as vinyl acetate, vinyl propionate, and allyl acetate; vinyl and allyl ethers of alkyl radicals containing 1 to 8 carbon atoms such as vinyl methyl ether, and allyl methyl ether; and monoolefins containing 2 to 14 carbon atoms, preferably 2 to 8 carbon atoms, such as ethylene, propylene, isobutylene, 1-butene, 1-pentene, 1-hexene, and 1-dodecene.

Also suitable as vinylidene comonomers are vinyl halides, such as vinyl bromide and vinyl chloride; divinyls and diacrylates, such as divinyl benzene, divinyl ether, and diethylene glycol diacrylate; amides of alpha, beta-olefinically unsaturated carboxylic acids containing 2 to 8 carbon atoms, such as acrylamide; and other vinylidene monomers such as bis(beta-chloroethyl vinyl) phosphonate, N-vinyl pyrrolidone, and diacetone acrylamide.

Amount of the mercaptan component containing hydroxyl and/or carboxyl group(s) depends on a number of considerations. If an excess amount of the mercaptan is used, viscosity will be reduced drastically with a loss of adhesive properties whereas if a very small amount thereof is interpolymerized, adhesive properties will not suffer considerably, however, the desired viscosity reduction will not be attained. Recommended amounts of the mercaptan compound can be in the range of about 0.5 to 10, preferably 1 to 5 weight percent, based on the combined weight of the monomers. Suitable mercaptan compounds are aliphatic containing hydroxyl and/or carboxyl group(s) and a total of 2 to 8, preferably 2 to 4 carbon atoms in the carbon chain. These compounds can contain 1 to 4, preferably 1 to 2 hydroxyl groups with the mercaptan group preferably positioned on the terminal carbon atom. Specific examples of suitable mercaptan compounds include 2-mercaptoethanol, 3-mercaptopropanol, 3-monothioglycerol, and thioglycolic acid.

From about 0.1 to 20, preferably from 1 to 10 weight percent, based on total weight of the monomers that are used to prepare the hydroxylated liquid polymer, is a hydroxyl-containing disulfide and/or trisulfide, the function of which is to act as a chain transfer agent and a polymerization modifier. If a mixture of the sulfides is used, it should comprise a preponderance of the disulfide, preferably in excess of about 90 weight percent. Examples of suitable hydroxyl-containing sulfides include 2-hydroxyethyl difulfide, 2-hydroxyethyl trisulfide, 3-hydroxypropyl disulfide, 3-hydroxypropyl trisulfide, and the like. Such modifiers are generally defined as hydroxyalkyl disulfides and trisulfides wherein the alkyl group contains 1 to 8, preferably 2 to 4 carbon atoms.

Air and oxygen have an inhibiting effect on the polymerization of the monomers in the production of hydroxyl-containing liquid polymers and should, for this reason, be excluded. Therefore, the reaction vessel is flushed with nitrogen before the vessel is charged, and a nitrogen purge may be continued if necessary to exclude air during polymerization. The reaction generally is conducted with stirring at about 80°–90° C., with cooling provided, if necessary. The polymerization rate may be monitored by withdrawing reaction mixture samples at periodic intervals for percent conversion analysis. The reaction can be run to 100% conversion, but it generally is more economical to run to about 70 to 98% conversion and recover unreacted monomer for reuse. The hydroxyl-containing liquid polymer can be purified by vacuum distillation or by washing with water in order to remove the unreacted hydroxyl-containing disulfide, followed by drying the polymer. The structure of the hydroxyl-containing liquid polymer can be confirmed by infrared analysis, together with well-known wet chemical methods for determination of hydroxyl and sulfur content. Number average molecular weights ($\overline{M}_n$) can be measured using vapor pressure osmometry, gel permeation chromatography, or the like.

The other critical component of pressure sensitive adhesives described herein comprises a prepolymer of a polyester glycol or a polyalkylene ether glycol with an excess amount of an aromatic diisocyanate. Suitable polyalkylene ether glycols produced by methods well known to the art contain from 3 to 6 carbon atoms per alkylene group and have a molecular weight from about 400 to about 2,000. Examples of such glycols include polypropylene ether glycol, polytetramethylene ether glycol, and the like. Preferred polyalkylene ether glycols contain from 3 to 5 carbon atoms per alkylene group and have a molecular weight from about 400 to 1,500. Excellent results were obtained using polytetramethylene ether glycol having a molecular weight of about 600. Mixtures of polyalkylene ether glycols may also be used.

Polyester glycols are less preferred for use in the prepolymers. Polyester glycols may be prepared by methods well known to the art for use in the prepolymer, as by an esterification reaction of an aliphatic dicarboxylic acid or anhydride thereof with a glycol. Molar ratios of more than 1 mole of glycol to acid are preferred in order to obtain linear chains containing a preponderance of terminal hydroxyl groups. Suitable aliphatic dicarboxylic acids include adipic, succinic, pimelic, suberic, azelaic, sebacic, and the like, or their anhydrides. Preferred dicarboxylic acids are those of the formula HOOC—R—COOH wherein R is an alkylene radical containing 2 to 8 carbon atoms, such as adipic acid. The glycols used in the preparation of the polyester by reaction with an aliphatic dicarboxylic acid are preferably straight chain glycols containing between 4 and 10 carbon atoms such as 1,4-butanediol, 1,6-hexanediol, 1,8-octanediol, and the like. In general the glycol is preferably of the formula $HO(CH_2)_xOH$, wherein x is 4 to 8. The preferred glycol is 1,4-butanediol.

Aromatic diisocyanates suitable for use in the isocyanate-terminated prepolymers contain from 8 to about 24 carbon atoms, preferably from 8 to 16 carbon atoms. Examples of suitable aromatic diisocyanates include p-phenylene diisocyanate, 2,4 and 2,6 isomers of toluene diisocyanate, 4,4'-biphenylene diisocyanate, 4,4'-diphenylmethylene diisocyanate, 1,5-naphthylene diisocyanate, and the like. Mixtures of aromatic diisocyanates may also be used. Excellent results were obtained using mixtures of 2,4-toluene diisocyanate and 2,6-toluene diisocyanate, particularly a mixture of about 65 weight percent 2,4-toluene diisocyanate and 35 weight percent of 2,6-toluene diisocyanate, and a mixture of about 80 weight percent 2,4-toluene diisocyanate and 20 weight percent 2,6-toluene diisocyanate.

The isocyanate-terminated prepolymers may be prepared by reacting an excess in equivalents of the aromatic diisocyanate with the polyester glycol or polyalkylene ether glycol described heretofore. The prepolymers may have molecular weights from about 800 to about 3,000, preferably from about 900 to about 2,000. The prepolymers must contain excess free isocyanate groups, typically from about 2 weight percent to about 10 weight percent excess, more preferably from about 4 weight percent to about 7 weight percent excess based upon prepolymer weight. Excellent results were obtained using a prepolymer of toluene diisocyanate and polytetramethylene ether glycol, the glycol having a molecular weight of about 1,350 and about 6 weight percent free NCO, sold under the trademark Adiprene L-167 by E. I. duPont de Nemours & Co. Excellent results also were obtained using a prepolymer of toluene diisocyanate and polypropylene ether glycol, the prepolymer having a molecular weight of about 1,775 and about 5 weight percent free NCO, sold under the trademark Castomer E-0002 by Witco Chemical Corporation.

The isocyanate-terminated prepolymers may be blocked using known blocking agents such as phenols, tertiary alcohols, hydrocyanic acid, oximes such as methyl ethyl ketoxime, and the like. The blocked prepolymer and the hydroxylated alkyl acrylate liquid polymer described heretofore may be mixed to form the adhesive composition of the present invention. Blocking allows storage of the mixture for extended time periods at ambient temperatures without substantial reaction and without adverse effects upon ultimate adhesive properties. The blocked prepolymer in the mixture may be unblocked by heating, typically to about 100°–150° C., and the adhesive composition cured to its final pressure-sensitive state.

The pressure-sensitive adhesive of the present invention comprises the reaction product of at least one hydroxylated liquid polymer containing both terminal and random hydroxyl functionality and at least one prepolymer of a polyester glycol or a polyalkylene ether glycol with an excess amount of an aromatic diisocyanate. The hydroxylated liquid polymer has interpolymerized therein mercaptan compound which functions as a chain transfer agent to reduce viscosity of the polymer. The adhesive has a full range of suitable adhesive properties, including excellent rolling ball tack, 180° peel adhesion and shear adhesion. The hydroxylated liquid polymer is used in a ratio of isocyanate-terminated prepolymer sufficient to provide a ratio of about 0.7 to about 4.5 hydroxyl equivalents per free isocyanate equivalent. A preferred ratio is about 1.2 to about 4 hydroxyl equivalents per equivalent of free isocyanate.

Catalysts well known to the art may be used for the hydroxyl-isocyanate reaction, typically in amounts from about 0.001% to about 0.5% by weight of total reactants. Suitable catalysts include stannous salts of aliphatic carboxylic acids containing from 1 to 20 carbon atoms, such as stannous octoate, stannous neodecanoate, and the like. Other suitable catalysts include lead naphthenate, dibutyl tin dilaurate, and the like. Excellent results were obtained using dibutyl tin dilaurate.

A solvent for the pressure-sensitive adhesive composition need not be used in order to avoid toxicity and flammability problems, excessive bulk per unit amount of adhesive, and extra costs of the solvent itself. However, a solvent or solvent mixture may be desired in some cases to enhance compatibility and flow properties of the pressure-sensitive adhesive components before and during reaction. As is usually true with isocyanate-containing compositions, it is desirable to exclude as much water as possible; therefore, the solvents should be as anhydrous as possible. Suitable solvents include liquid aromatic hydrocarbons such as benzene, toluene, xylene, mesitylene, and the like; liquid ketones such as methyl ethyl ketone, acetone, methyl butyl ketone, and the like; liquid chlorinated hydrocarbons such as methylene chloride, 1,1,1-trichloroethane, and the like; liquid esters such as ethyl acetate, ethoxyethyl acetate, and the like; and liquid alkanes such as pentane, hexane, heptane, and the like. Solvent mixtures may also be used. Excellent results were obtained using toluene together with ethyl acetate.

A tackifying additive is not required but may be used to impart increased pressure-sensitivity and tackiness to an adhesive of this invention. A tackifier may be used in an amount from about 10 to about 30 parts by weight and more per 100 parts by weight of adhesive. Suitable tackifying additives include chlorinated biphenyl resins such as chlorinated biphenyl and chlorinated polyphenyl; coumarone-indene resins such as polymerized coal-tar light oils; plasticizers such as dioctyl phthalate; polystyrenes such as poly($\alpha$-methyl styrene); polyterpene resins such as poly($\beta$-pinene); rosin and rosin derivatives such as the glycerol ester of hydrogenated rosin and methyl ester of hydrogenated rosin, and the like. Chain extenders may be used, including polyols such as the glycols described in connection with preparation of the isocyanate-terminated prepolymer, as well as amines, and the like. Other additives known in the art may also be used such as antioxidants, photostabilizers, flow modifiers including sintered colloidal silicas such as those sold under the trademark Cab-O-Sil by Cabot Corporation, and the like.

The components of the pressure-sensitive adhesive may be combined and mixed in any order and by any method that provides both a final homogeneous liquid mixture or solution, and allows sufficient time after mixing so that casting or application can be performed before substantial thickening or solidification occurs. Such mixing techniques are well known in the art and may be performed using equipment such as the Liquid Control Corporation TwinFlow ® machine.

When mixing is complete, the mixture is applied to a substrate such as paper, plastic film, release paper, metal foil, or the like. Conventional application or casting means can be used to meter and obtain a desired uniform thickness across a given substrate, such as a wire-wound rod, gravure coater, differential roll coater reverse roll coater, knife-over-roll coater, or the like.

The coated substrate is generally cured partially or completely by heating before winding, particularly if a solvent is used. However, the coated substrate may be wound before curing if a bulk adhesive without solvent is used. Suitable heating means include circulating air ovens, infrared heaters and heated drums.

The following examples are presented for the purpose of illustrating the novel aspects of the invention described herein and is not to be construed as placing any limitation on the scope of the appended claims.

EXAMPLE 1

Samples of alkyl acrylate liquid polymer containing both terminal and random functionality were prepared using the following formulations, test samples with a mercaptan compound and the control, without the mercaptan compound, the ingredients being given in parts by weight:

|  | Control | Test Samples | | | |
|---|---|---|---|---|---|
|  |  | A | B | C | D |
| n-Butyl Acrylate | 93 | 93 | 93 | 93 | 90 |
| 2-Hydroxyethyl Acrylate | 2 | 6 | 6 | 6 | 6 |
| N-Vinyl-2-Pyrrolidone | 5 | 3 | 5 | 5 | 5 |
| Acrylamide | — | 1 | 1 | 1 | — |
| 2-Hydroxyethyl Disulfide | 6 | 4 | 4 | 4 | — |
| 2-Mercaptoethanol | — | 2 | — | — | 2 |
| Thioglycerol | — | — | 2 | — | — |
| Thioglycerolic Acid | — | — | — | 2 | — |
| Azoisobutyronitrile | 1 | 1 | 1 | 1 | 1 |
| Acetone Solvent | 50 | 60 | 60 | 60 | 50 |

In the preparation of the liquid polymer, blend #1 was prepared by mixing the hydroxyethyl disulfide and the mercaptan compound with about half of the acetone. Blend #2 was prepared by mixing n-butyl acrylate, 2-hydroxyethyl acrylate, N-vinyl-2-pyrrolidone, and acrylamide. Blend #3 was a mixture of azoisobutyronitrile and the remaining half of acetone.

A 15-gallon reactor was equipped with a twin-blade turbine stirrer, a feed tank, dip tube, and proportioning pumps for feeding monomers into the reactor. The reactor was cleaned thoroughly with acetone and dried with nitrogen. The reactor was evacuated three times and the vacuum broken each time with nitrogen. Thereafter, a small nitrogen purge was maintained during polymerization. Agitation was begun, and blend #1 was charged to the reactor and heated quickly to 90° C. Blends #2 and #3 were proportioned separately into the reactor over a period of about 50 minutes. When charging was complete, reaction was continued for about 2 more hours, after which the reactor and contents were cooled rapidly to about 30° C. Reactor contents were dried at about 115° C. and 100 mm Hg using a Rodney-Hunt evaporator. The samples had the following physical properties:

|  | Control | Test Samples | | | |
|---|---|---|---|---|---|
|  |  | A | B | C | D |
| Brookfield Viscosity at 25° C. (cps) | 290,000 | 180,000 | 184,000 | 116,000 | 256,000 |
| Molecular Weight ($M_n$) | 3,400 |  |  |  |  |
| Hydroxyl Number | 46 | 55.1 | 54.6 | 35.1 | 40.9 |

The isocyanate component used in the preparation of an adhesive composition was a prepolymer of polypropylene ether glycol and toluene diisocyanate which had a molecular weight of about 1,775 and contained about 5 weight percent of free NCO. The prepolymer is sold by Witco Chemical under the designation Castomer E-0002.

The control and test adhesives were prepared by mixing the above-identified hydroxylated liquid polymers with the isocyanate prepolymer. The hydroxylated liquid polymer was used as an 80 weight percent solids solution in a solvent mixture of 75 weight percent toluene and 27 weight percent ethyl acetate. The mixtures of hydroxylated liquid polymer and the prepolymer were stirred with a spatula until they became homogeneous at which time, one or two drops of dibutyl tin dilaurate catalyst was added with mixing. Viscosity of the control adhesive at this point was about 2400 cps and that of the test adhesives was about 1200 cps. Each adhesive was then applied in 0.00125 inch thickness on Mylar film using a Gardner knife applicator set at 0.004 inch gap. Each film sample coated with the adhesives was cured at 150° C. for 2 minutes and thereafter allowed to age overnight before testing.

The adhesive samples were evaluated with respect to Pressure Sensitive Tape Council standard test methods for rolling ball tack, 180° peel adhesion, and shear adhesion or static shear at 70° C. Maximum desirable test value for rolling ball tack after curing of a given adhesive is 4 inches. With respect to 180° peel adhesion for low peel adhesives, minimum desirable test value after curing the adhesive is about 10 ounces, and should be on the order of 15 ounces, preferably in the range of about 10 to 25. Shear adhesion values for cured adhesives should be in excess of 48 hours. Results of the tests are given in Table I below for cured control adhesive and several cured test adhesives with varying OH/NCO ratios:

TABLE I

| | OH/NCO Ratio | R. Ball Tack (inches) | 180° Peel (ounces) | S. Shear (hours) |
|---|---|---|---|---|
| Control Sample | 1.3 | 1.2 | 52 | >100 |
| Test Sample A | 1.1 | 1.6 | 12.8 | >100 |
| Test Sample A | 1.2 | 1.4 | 17 | >100 |
| Test Sample A | 1.3 | 1.1 | 20.3 | >100 |
| Test Sample A | 1.4 | 0.98 | 24 | >100 |
| Test Sample B | 1.2 | 4.4 | 12.4 | >100 |
| Test Sample B | 1.1 | 4.8 | 8.5 | >100 |
| Test Sample C | 1.1 | 1.3 | 35 | >48 |
| Test Sample D | 1.75 | 1.8 | 12 | >100 |

On the basis of the data given in this Example, it should be apparent that addition of a mercaptan compound during preparation of a hydroxylated liquid polymer, results in a product with substantially lower viscosity which also yields an adhesive of lower viscosity. This feature permits the use of existing adhesive application machinery and facilitates application of the adhesive onto a substrate at high solids or at 100% solids. One requirement for low-peel pressure sensitive tape is that it be capable of being removed with clean peel. The peel value for the control adhesive are too high to meet this requirement.

I claim:

1. Hydroxylated liquid polymer composition comprising at least one alkyl acrylate liquid polymer containing polymerized therein a mercaptan compound containing hydroxyl and/or carboxyl group(s), or a mixture of such mercaptan compounds, said hydroxylated liquid polymer having about 1.4 to about 6 hydroxyl groups per molecule, and amount of said mercaptan compound being sufficient to reduce viscosity of said liquid polymer without significantly lowering adhesive properties thereof.

2. Composition of claim 1 comprising at least 65 weight percent alkyl acrylate wherein the alkyl group contains 3 to 10 carbon atoms, the hydroxylated liquid polymer has molecular weight ($\overline{M}_n$) of about 1,000 to about 6,000, and amount of the mercaptan compound is 0.5 to 10 weight percent based on the weight of the monomers used to prepare the hydroxylated liquid polymer.

3. Composition of claim 2 having polymerized therein 0.1 to 30 weight percent hydroxyl-containing monomer to provide terminal and random hydroxy functionality, 1 to 20 weight percent of a vinyl pyrrolidone for improvement of clarity and adhesion, and 0.1 to 20 weight percent of a polymerization initiator selected from hydroxyalkyl disulfides and trisulfides wherein the alkyl group contains 1 to 8 carbon atoms.

4. Composition of claim 3 wherein amount of the hydroxyl-containing monomer is 1 to 20 weight percent and such monomers are selected from hydroxyalkyl esters of alpha, beta unsaturated aliphatic and aromatic carboxylic acids containing 3 to 12 carbon atoms; amount of the pyrrolidone is 2 to 10 weight percent and it is N-vinyl-2-pyrrolidone; and amount of the initiator is 1 to 10 with the alkyl group containing 2 to 4 carbon atoms.

5. Composition of claim 4 comprising at least 85 weight percent alkyl acrylate wherein the alkyl group contains 3 to 8 carbon atoms; the hydroxylated liquid polymer has molecular weight of about 2,000 to about 4,000; amount of the mercaptan compound is 1 to 5 weight percent and it is selected from aliphatic monothiohydroxy compounds containing 2 to 8 carbon atoms and 1 to 4 hydroxyl groups, and aliphatic thiocarboxylic acids containing 2 to 8 carbon atoms.

6. Composition of claim 5 wherein the mercaptan compound is selected from monothiohydroxy compounds of 2 to 4 carbon atoms and 1 to 2 hydroxyl groups, and monothiocarboxylic acids of 2 to 4 carbon atoms.

7. Composition of claim 6 wherein the hydroxylated liquid polymer is a polymerization product of alkyl acrylate, monohydroxyalkyl acrylate containing 3 to 8 carbon atoms, and hydroxyalkyl disulfide, the composition having viscosity of about 50,000 to about 200,000 in absence of any solvent or diluent.

8. Composition of claim 7 including about 1 to 10 weight percent, based on total monomer weight, of an amide of alpha, beta-olefinically unsaturated carboxylic acid containing 2 to 8 carbon atoms.

9. Composition of claim 7 including about 0 to 30 weight percent, based on total monomeric weight, of a vinylidene comonomer containing at least one terminal $CH_2=C<$ group per molecule selected from dienes containing 4 to 10 carbon atoms, vinyl nitriles, alkyl acrylates and methacrylates wherein the alkyl group can be hydrogen or a carbon chain of 1 to 18 carbon atoms, vinyl aromatics, vinyl and allyl esters of carboxylic acids containing 2 to 8 carbon atoms, vinyl and allyl ethers with alkyl radicals containing 1 to 8 carbon atoms, monoolefins of 2 to 14 carbon atoms, vinyl halides, divinyls and diacrylates, hydroxyl-containing vinylidene monomers, diacetone acrylamide, and mixtures thereof.

10. An adhesive composition for pressure-sensitive tape with low peel property comprising a reaction product of a hydroxylated liquid polymer and an isocyanate prepolymer; the hydroxylated liquid polymer is a reaction product comprising at least about 65 weight percent of at least one alkyl acrylate containing both terminal and random hydroxyl functionality with 3 to 10 carbon atoms in the alkyl group, a sufficient amount of a mercaptan compound to reduce viscosity of the liquid polymer without significantly lowering adhesive properties thereof, an average of about 1.4 to about 6 hydroxyl groups per molecule, and a molecular weight ($\overline{M}_n$) of about 1,000 to 6,000; the isocyanate prepolymer is a reaction product of a polyalkylene ether glycol or polyester glycol with an excess amount of an aromatic diisocyanate, the prepolymer has molecular weight of about 800 to about 3,000, the aromatic diisocyanate contains 8 to about 24 carbon atoms; and the ratio of hydroxyl equivalents to free isocyanate equivalents is from about 0.7/1 to about 4.5/1.

11. Composition of claim 10 wherein the alkyl acrylate has a molecular weight of about 2,000 to 4,000, the prepolymer has a molecular weight of about 9,000 to 2,000, and the polyalkylene ether glycol contains from 3 to 6 carbon atoms per alkylene group and has molecular weight of about 400 to 2,000.

12. Composition of claim 11 wherein the hydroxylated liquid polymer has polymerized therein 0.1 to 30 weight percent hydroxyl-containing monomer to provide terminal and random hydroxy functionality, 1 to 20 weight percent of a vinyl pyrrolidone for improvement of clarity and adhesion, and 0.1 to 20 weight percent of a polymerization initiator selected from hydroxyalkyl disulfides and trisulfides wherein the alkyl group contains 1 to 8 carbon atoms.

13. Composition of claim 12 wherein amount of the hydroxyl-containing monomer is 1 to 20 weight percent and such monomers are selected from hydroxyalkyl esters of alpha, beta unsaturated aliphatic and aromatic carboxylic acids containing 3 to 12 carbon atoms; amount of the pyrrolidone is 2 to 10 weight percent and it is N-vinyl-2-pyrrolidone; and amount of the initiator is 1 to 10 weight percent with the alkyl group containing 2 to 4 carbon atoms.

14. Composition of claim 13 wherein said hydroxylated liquid polymer is a reaction product comprising at least 85 weight percent alkyl acrylate wherein the alkyl group contains 3 to 8 carbon atoms; 1 to 5 weight percent of the mercaptan compound selected from aliphatic monothiohydroxy compounds containing 2 to 8 carbon atoms and 1 to 4 hydroxyl groups, and aliphatic thiocarboxylic acids containing 2 to 8 carbon atoms; said hydroxylated liquid polymer has molecular weight of about 2,000 to 4,000.

15. Composition of claim 14 having 180° peel of about 10 to 25 wherein the mercaptan compound is selected from monothiohydroxy compounds of 2 to 4 carbon atoms and 1 to 2 hydroxyl groups.

16. Composition of claim 15 wherein the hydroxylated liquid polymer is a polymerization product of alkyl acrylate, monohydroxyalkyl acrylate containing 3 to 8 carbon atoms and hydroxyalkyl disulfide, the composition having viscosity of about 50,000 to about 200,000 in absence of any solvent or diluent.

17. Composition of claim 16 wherein the hydroxylated liquid polymer has polymerized therein about 1 to 10 weight percent, based on total monomer weight, of an amide of alpha, beta-olefinically unsaturated carboxylic acid containing 2 to 8 carbon atoms.

18. Composition of claim 16 wherein the hydroxylated liquid polymer has polymerized therein about 0 to 30 weight percent, based on total monomer weight, of a vinylidene comonomer containing at least one terminal $CH_2=C<$ group per molecule selected from dienes containing 4 to 10 carbon atoms, vinyl nitriles, alkyl acrylates and methacrylates wherein the alkyl group can be hydrogen or a carbon chain of 1 to 18 carbon atoms, vinyl aromatics, vinyl and allyl esters of carboxylic acids containing 2 to 8 carbon atoms, vinyl and allyl ethers with alkyl radicals containing 1 to 8 carbon atoms, monoolefins of 2 to 14 carbon atoms, vinyl halides, divinyls and diacrylates, hydroxyl-containing vinylidene monomers, diacetone acrylamide, and mixtures thereof.

19. Composition of claim 15 wherein the isocyanate prepolymer is selected from prepolymers of polytetramethylene ether glycol with toluene diisocyanate or polypropylene ether glycol with toluene diisocyanate.

20. Composition of claim 16 wherein the isocyanate prepolymer is selected from prepolymers of polytetramethylene ether glycol with toluene diisocyanate or polypropylene ether glycol with toluene diisocyanate.

21. Composition of claim 18 wherein the isocyanate prepolymer is selected from prepolymers of polytetramethylene ether glycol with toluene diisocyanate or polypropylene ether glycol with toluene diisocyanate.

22. A substrate having deposited thereon an adhesive composition comprising a reaction product of a hydroxylated liquid polymer and an isocyanate prepolymer; the hydroxylated liquid polymer comprising at least about 65 weight percent of at least one alkyl acrylate containing both terminal and random hydroxyl functionality and 3 to 10 carbon atoms in the alkyl group, a sufficient amount of a mercaptan compound to reduce viscosity of the hydroxylated liquid polymer without significantly lowering adhesive properties thereof, an average of about 1.4 to about 6 hydroxyl groups per molecule, and a molecular weight ($\overline{M}_n$) of about 1,000 to 6,000; the isocyanate prepolymer is a reaction product of a polyalkylene ether glycol or polyester glycol with an excess amount of an aromatic diisocyanate, the prepolymer has molecular weight of about 800 to about 3,000, the aromatic diisocyanate contains 8 to about 24 carbon atoms; and the ratio of hydroxyl equivalents to free isocyanate equivalents is from about 0.7/1 to about 4.5/1.

23. A substrate of claim 22 wherein the alkyl acrylate has a molecular weight of about 2,000 to about 4,000, the prepolymer has a molecular weight of about 9,000 to about 2,000, and the polyalkylene ether glycol contains from 3 to 6 carbon atoms per alkylene group and has molecular weight of about 400 to about 2,000.

24. A substrate of claim 23 selected from paper, plastic film, release paper, and metal foil wherein the hydroxylated liquid polymer has polymerized therein 0.1 to 30 weight percent hydroxyl-containing monomer to provide terminal and random hydroxy functionality, 1 to 20 weight percent of a vinyl pyrrolidone for improvement of clarity and adhesion, and 0.1 to 20 weight percent of a polymerization initiator selected from hydroxyalkyl disulfides and trisulfides wherein the alkyl group contains 1 to 8 carbon atoms.

25. Substrate of claim 24 wherein the hydroxylated liquid polymer comprises at least 85 weight percent alkyl acrylate wherein the alkyl group contains 3 to 8 carbon atoms, the hydroxylated liquid polymer has molecular weight of about 2,000 to about 4,000, and has polymerized therein 1 to 5 weight percent of the mercaptan compound selected from aliphatic monothiohydroxy compounds containing 2 to 8 carbon atoms and 1 to 4 hydroxyl groups, and aliphatic thiocarboxylic acids containing 2 to 8 carbon atoms.

26. Substrate of claim 25 wherein the hydroxylated liquid polymer has 180° peel of about 10 to 25 and the mercaptan compound is selected from monothiohydroxy compounds of 2 to 4 carbon atoms and 1 to 2 hydroxyl groups.

27. Substrate of claim 26 wherein the hydroxylated liquid polymer is a polymerization product of alkyl acrylate, monohydroxyalkyl acrylate containing 3 to 8 carbon atoms and hydroxyalkyl disulfide, the composition having viscosity of about 50,000 to about 200,000 in absence of any solvent or diluent.

28. Substrate of claim 27 wherein the hydroxylated liquid polymer includes about 1 to 10 weight percent, based on total monomer weight, of an amide of alpha, beta-olefinically unsaturated carboxylic acid containing 2 to 8 carbon atoms.

* * * * *